US012761375B2

(12) United States Patent
Henry et al.

(10) Patent No.: US 12,761,375 B2
(45) Date of Patent: Oct. 13, 2026

(54) REGIONAL POSITION ESTIMATOR FOR NETWORK DEVICES

(71) Applicant: Cisco Technology, Inc., San Jose, CA (US)

(72) Inventors: Jerome Henry, Pittsboro, NC (US); Peiman Amini, Fremont, CA (US); Ardalan Alizadeh, Campbell, CA (US); Niloo Bahadori, Greensboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 18/466,716

(22) Filed: Sep. 13, 2023

(65) Prior Publication Data

US 2025/0085442 A1 Mar. 13, 2025

(51) Int. Cl.
*G01S 19/42* (2010.01)
*G01S 19/07* (2010.01)
(Continued)

(52) U.S. Cl.
CPC .............. *G01S 19/42* (2013.01); *G01S 19/07* (2013.01); *G01S 19/30* (2013.01); *G01S 19/48* (2013.01); *G01S 19/50* (2013.01)

(58) Field of Classification Search
CPC .......... G01S 19/42; G01S 19/50; G01S 19/30; G01S 19/48; G01S 19/07; G01S 19/073; G01S 19/425
(Continued)

(56) References Cited

U.S. PATENT DOCUMENTS 6,894,645 B1 * 5/2005 Akopian ................. G01S 19/25 342/464
9,448,307 B2 * 9/2016 Ben-Moshe ............ G01S 19/40
(Continued)

FOREIGN PATENT DOCUMENTS

CN 104380141 B * 10/2017 ............. G01S 19/26
EP 2556603 B1 * 6/2019 ............. G01S 19/38

OTHER PUBLICATIONS

International Search Report and Written Opinion for International Application No. PCT/US2024/046452, mailed Feb. 10, 2025, 21 Pages.

(Continued)

*Primary Examiner* — Chuong P Nguyen
(74) *Attorney, Agent, or Firm* — Rutan & Tucker, LLP; Ravi Mohan; Marc A. McClain

(57) ABSTRACT

Devices, systems, methods, and processes for accurately determining a location of a device are described herein. The device may receive Global Navigation Satellite System (GNSS) data from two satellites in two time periods. The device can determine two pseudo range differences corresponding to the two satellites. The device may further determine two contours based on the two pseudo range differences. An overlap between the two contours may be utilized by the device to determine the location. The device can also determine the location of the device based on a contour and an estimated location. The device may utilize a Global Positioning System (GPS) database, an Access Points (AP) database, or one or more servers to retrieve the estimated location. The device can further configure an operating frequency and an output power based on the location in real-time.

20 Claims, 12 Drawing Sheets

(51) Int. Cl.
*G01S 19/30* (2010.01)
*G01S 19/48* (2010.01)
*G01S 19/50* (2010.01)

(58) Field of Classification Search
USPC ............ 342/357.25, 357.33, 357.69, 357.31, 342/357.44
See application file for complete search history.

(56) References Cited

U.S. PATENT DOCUMENTS

| | | | |
|---|---|---|---|
| 10,018,730 | B2 * | 7/2018 | Youssef ................ G01S 19/426 |
| 11,487,025 | B1 * | 11/2022 | Meyer ..................... G01S 19/49 |
| 12,439,370 | B2 * | 10/2025 | Amini ................... G01S 5/0244 |
| 2004/0145519 | A1 | 7/2004 | Cho |
| 2011/0028166 | A1 | 2/2011 | Ketchum et al. |
| 2011/0199964 | A1 | 8/2011 | Karaoguz et al. |
| 2016/0132879 | A1 | 5/2016 | Howe |
| 2016/0381218 | A1 | 12/2016 | Lee et al. |
| 2022/0264681 | A1 | 8/2022 | Labadie et al. |
| 2023/0204794 | A1 | 6/2023 | Carrie et al. |
| 2024/0168172 | A1 * | 5/2024 | Gao ........................ G01S 19/41 |

OTHER PUBLICATIONS

Leva J.L., "An Alternative Closed-Form Solution to the GPS Pseudo-Range Equations", IEEE Transactions on Aerospace and Electronic Systems, IEEE Service Center, Piscataway, NJ, US, vol. 32, No. 4, Oct. 1, 1996, XP011081061, pp. 1430-1439, ISSN: 0018-9251, The whole document.

* cited by examiner

REGIONAL POSITION ESTIMATOR FOR NETWORK DEVICES

The present disclosure relates to communication networks. More particularly, the present disclosure relates to determining a regional position of a device in a communication network.

BACKGROUND

Communication networks include various interconnected devices. These devices are interconnected by wired or wireless communication links. Parameters of the communication links, such as frequency and power levels of signals are governed by regulations. The regulations are jurisdictional in nature, and hence, differ from one geographical area to other. Therefore, the devices in the communication networks should be correctly configured to operate according to the regulations of the corresponding geographical area. Commonly, the devices are pre-configured at the time of manufacturing to operate as per the regulations of the geographical area, and hence, are locked to that geographical area.

Most of the devices include global navigation satellite system (GNSS) receivers. However, for positioning of the device, a GNSS receiver must receive GNSS data from at least five GNSS satellites. The GNSS receiver utilizes the GNSS data from four GNSS satellites to build four pseudo range equations that determine a location of the GNSS receiver and the GNSS data from a fifth GNSS satellite to improve an accuracy of the location. Since the devices are commonly used indoors, the GNSS receivers often do not have visibility to five GNSS satellites.

Therefore, the devices cannot determine the location in which the devices are deployed. Consequently, the devices cannot adjust the operating frequencies and power levels in real-time to comply to the regulations that govern the location. As a result, all conventional devices are pre-configured and are limited to only one geographical area. Such pre-configured devices cannot be used at any place other than the geographical area.

SUMMARY OF THE DISCLOSURE

Systems and methods determining a regional position of a device in a communication network in accordance with embodiments of the disclosure are described herein. In some embodiments, a device, includes a processor, a memory communicatively coupled to the processor, at least one global navigation satellite system (GNSS) receiver configured to receive a plurality of signals from at least one satellite, and a location identification logic. The logic is configured to identify a first contour of geolocations, identify a second contour of geolocations, determine an area of overlap between the first contour and the second contour, and determine a location of the device based on the area of overlap In some embodiments, the location identification logic is further configured to determine a first pseudo range difference based on a first signal and a second signal received from a first satellite, and wherein the first contour of geolocations is associated with the first pseudo range difference.

In some embodiments, the location identification logic is further configured to determine a second pseudo range difference is based on a third signal and a fourth signal received from a second satellite, and wherein the second contour of geolocations is associated with the second pseudo range difference.

In some embodiments, the first signal and the second signal are received during a first time period, and the third signal and the fourth signal are received during a second time period.

In some embodiments, the device is stationary during the first time period and the second time period.

In some embodiments, the location identification logic is further configured to receive a fifth signal from a third satellite, wherein the fifth signal includes a pseudo random code indicative of a satellite identifier and a timestamp, determine a clock drift based on the pseudo random code, and synchronize a local clock signal based on the clock drift.

In some embodiments, the location identification logic determines the first pseudo range difference and the second pseudo range difference based on the local clock signal.

In some embodiments, determining the first pseudo range difference includes receiving the first signal from the first satellite at a first time instant, extracting a first timestamp from the first signal, receiving the second signal from the first satellite at a second time instant, extracting a second timestamp from the second signal, determining a distance travelled by the first satellite in the first time period based on a difference between the first timestamp and the second timestamp, and determining the first pseudo range difference based on the distance travelled by the first satellite in the first time period.

In some embodiments, determining the second pseudo range difference includes receiving the third signal from the second satellite at a third time instant, extracting a third timestamp from the third signal, receiving the fourth signal from the second satellite at a fourth time instant, extracting a fourth timestamp from the second signal, determining a distance travelled by the second satellite in the second time period based on a difference between the third timestamp and the fourth timestamp, and determining the second pseudo range difference based on the distance travelled by the second satellite in the second time period.

In some embodiments, each of the first signal and the second signal received from the first satellite, and the third signal and the fourth signal received from the second satellite includes corresponding pseudo random code, corresponding almanac data, and corresponding ephemeris data.

In some embodiments, the location identification logic is further configured to determine an operating frequency and an output power level of the device based on the location of the device.

In some embodiments, the device operates in a safe mode until the location of the device is determined.

In some embodiments, the location of the device is refined based on a plurality of contours of geolocations determined for a plurality of pseudo range differences for a plurality of satellites.

In some embodiments, a device includes a processor, a memory communicatively coupled to the processor, at least one global navigation satellite system (GNSS) receiver configured to receive a plurality of signals from at least one satellite, and a location identification logic. The logic is configured to identify a first contour of geolocations, retrieve an estimated location, determine an area of overlap between the first contour and the estimated location, and determine a location of the device based on the area of overlap.

In some embodiments, a device further includes determining a first pseudo range difference based on a first signal and a second signal received from a first satellite in a first time period, wherein the first contour of geolocations is associated with the first pseudo range difference.

In some embodiments, retrieving the estimated location includes querying a global positioning system (GPS) database of a plurality of fixed stations, determining a set of fixed stations from the plurality of fixed stations that observe the first pseudo range difference for the first satellite in the first time period, determining a closest fixed station from the set of fixed stations, and retrieving a location of the closest fixed station from the GPS database as the estimated location.

In some embodiments, retrieving the estimated location includes detecting one or more wireless signals with one or more access point identifiers, querying a crowd-sourced database of a plurality of access points and corresponding access point identifiers, identifying one or more access points based on the one or more access point identifiers, determining a closest access point from the one or more access points, and retrieving a location of the closest access point from the crowd-sourced database as the estimated location.

In some embodiments, retrieving the estimated location includes transmitting an echo request to a plurality of servers, receiving a plurality of responses from the plurality of servers, determining a round-trip time for each response, determining a server with lowest round-trip time, and extracting a location of the server with the lowest round-trip time from corresponding response as the estimated location.

In some embodiments, a method includes determining a first pseudo range difference based on a first signal and a second signal received by a device from a first satellite in a first time period, identifying a first contour of geolocations having the first pseudo range difference corresponding to the first satellite in the first time period, retrieving an estimated location, determining an area of overlap between the first contour and the estimated location, and determining a location of the device based on the area of overlap, wherein the device is stationary during the first time period.

In some embodiments, retrieving the estimated location is retrieved from at least one of a Global Positioning System (GPS) database or a crowd-sourced database of a plurality of access points.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
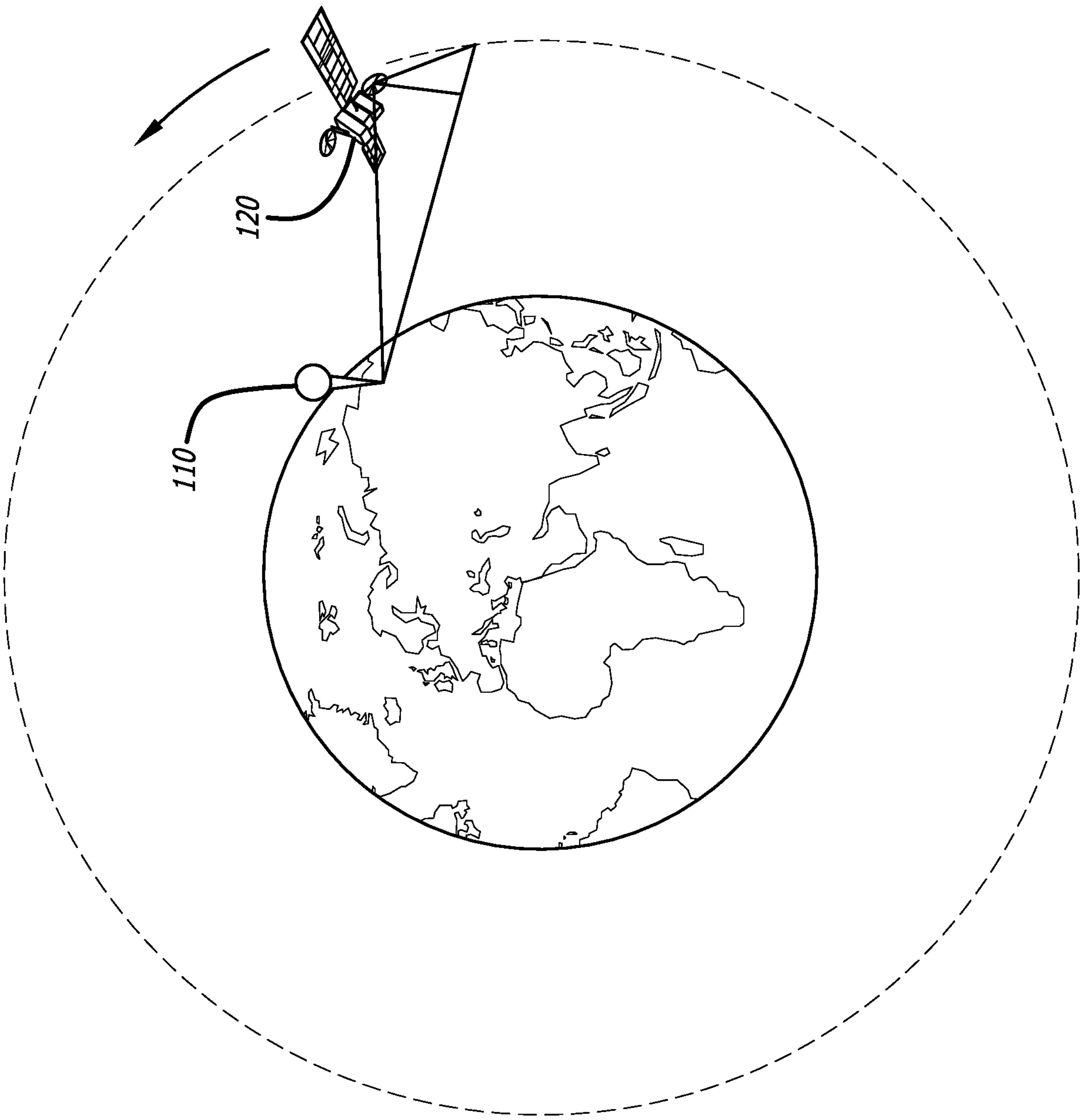
FIG. 1 is a conceptual illustration of a device and a satellite, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that determine a regional location of a device in a communication network. In many embodiments, the device determines the location and utilizes multiple techniques to refine the location to a required precision or accuracy. The device may utilize one or more global navigation satellite system (GNSS) receivers to receive signals from one or more satellites that may be visible to the device. In some embodiments, the device can be located indoors, outdoors, or partially indoors. When the device is located indoors or partially indoors, the device may have visibility to only a limited number of satellites, and may have visibility in only a limited portion of sky. The device can also be stationary and may observe fewer than five satellites. The GNSS receiver of the device can receive multiple signals. However, most of the signals may be reflected before reaching the GNSS receiver. In certain embodiments, the device can detect only one, or sometimes two satellites.

To precisely measure the location, the device may utilize one or more techniques, individually or in combination. In a number of embodiments, the device can receive two signals from a first satellite in a first time period. The device can also determine a first pseudo range difference based on the two signals. Since the device is stationary, the first pseudo range may indicate a change in position, or a distance travelled by the first satellite in the first time period. The device may further determine a first contour of a set of possible locations on earth's surface, which can observe the first satellite in the first time period with the first pseudo range difference. The device may receive next two signals from a second satellite in a second time period. The device can further determine a second pseudo range difference based on the next two signals. Since the device is stationary, the second pseudo range may indicate a change in position, or a distance travelled by the second satellite in the second time period. The device may further determine a second contour of another set of possible locations on the earth's surface, which can observe the second satellite in the second time period with the second pseudo range difference. The device can determine an area of overlap between the first contour and the second contour. The device can further determine the location of the device based on the area of overlap. In some embodiments, the first contour may be a first hyperbola, the second contour may be a second hyperbola, and the area of overlap may be an ellipse.

In various embodiments, the device can extract a pseudo random code from a signal received from the first satellite. The device may determine a clock drift based on the pseudo random code. The device can further synchronize a local clock signal based on the clock drift. To further refine the location of the device, the device may determine the area of overlap between the first contour and an estimated location. The estimated location can be retrieved from a global positioning system (GPS) database of a plurality of fixed stations. To extract the estimated location from the GPS database, the device can determine a set of fixed stations from the GPS database that observe the first pseudo range difference for the first satellite in the first time period. The device may determine a closest fixed station from the set of fixed stations and retrieve a location of the closest fixed station as the estimated location. The device can determine the location of the device based on the area of overlap between the first contour and the location of the closest fixed station.

The estimated location can also be retrieved from a crowd-sourced database. To extract the estimated location from the crowd-sourced database, the device can detect one or more wireless signals having one or more access point identifiers, such as basic service set identifier (BSSID) or SSID. The device can query the crowd-sourced database to identify the access points based on the identifiers. The device may further retrieve a location of the closest access point from the crowd-sourced database as the estimated location. The estimated location can further be retrieved based on response time of a plurality of servers. The device may transmit an echo request to the plurality of servers. The device can also determine a round-trip time for each response. The device may determine a server with the lowest round-trip time. The device may further extract the location of the server with the lowest round-trip time as the estimated location.

Hence, the device provided by the present disclosure can accurately determine the location in real-time. It may be understood by a person skilled in the art that an operating frequency and output power of the device depends on regulations of a geographical area in which the device is deployed. Conventional devices have been pre-configured to operate in one geographical area, and hence, could not be used globally. On the contrary, the device provided by the present disclosure can configure the operating frequency and the output power in real-time based on the determined location.

Advantageously, the device can be deployed at any place without requiring any pre-configuration before such deployment. Therefore, the same devices can be reused in any location, thereby eliminating the need of producing separate pre-configured devices for every location. This provides technical advancement as well as economic benefits by reducing wastage of devices. Further, the device can independently determine the location and perform the configuration of the operating frequency and the output power without requiring pairing with other devices, such as smartphones or computers. The device can also determine the location even if only one satellite is visible to the device, and hence, is not restricted to requiring visibility of five satellites. The device can determine the location equally accurately with full visibility of the satellites as well as partial visibility of the satellites. This allows the device to accurately determine the location in real-time in all types of environments, indoors, partially indoors, as well as outdoors.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a device 110 and a satellite 120, in accordance with various embodiments of the disclosure is shown. In some embodiments, the device 110 may be an Access Point (AP), a router, a switch, a modem, a server, or a gateway. In certain embodiments, the satellite 120 may include a global navigation satellite system (GNSS) satellite. In some more embodiments, the GNSS system may include Global Positioning System (GPS), GLObalnaya NAvigatsionnaya Sputnikovaya Sistema (GLONASS), Galileo, BeiDou, or Navigation with Indian Constellation (NavIC) etc.

In many embodiments, the device 110 may include one or more GNSS receivers to receive signals transmitted by the satellite 120. A GNSS receiver can receive GNSS data from the satellite on one or more frequency bands. In some non-limiting examples, the frequency bands can be L bands or S bands. The device 110 can also store the GNSS data in a memory of the device. In some embodiments, the GNSS data may include one or more of: pseudorandom codes, navigation message, carrier frequency, modulation data, ephemeris data, almanac data, clock corrections, status and health information, encryption and authentication information, or signal strength and quality indicators etc. In certain embodiments, the device 110 may be placed in an indoor environment. If the device 110 is placed in an indoor environment, the GNSS receiver may observe fewer than five number of satellites. In more embodiments, the device 110 may be stationary.

In a number of embodiments, it is essential to determine a location of the device 110. As may be understood by a person skilled in the art, different geographical locations, such as different countries, have different regulations for operating frequencies and output power on which the device 110 should operate. Based on the location of the device 110, the device 110 may be configured to operate on a predetermined frequency and at a predetermined output power to comply with the regulations of the location.

Although a specific embodiment for the device 110 and the satellite 120 suitable for carrying out the various steps, processes, methods, and operations described herein is discussed with respect to FIG. 1, any of a variety of systems and/or processes may be utilized in accordance with embodiments of the disclosure. In some embodiments, the device 100 may be configurable for use in multiple geographical locations based on the location of the device 110. The elements depicted in FIG. 1 may also be interchangeable with other elements of FIGS. 2-12 as required to realize a particularly desired embodiment.

Figure 2:
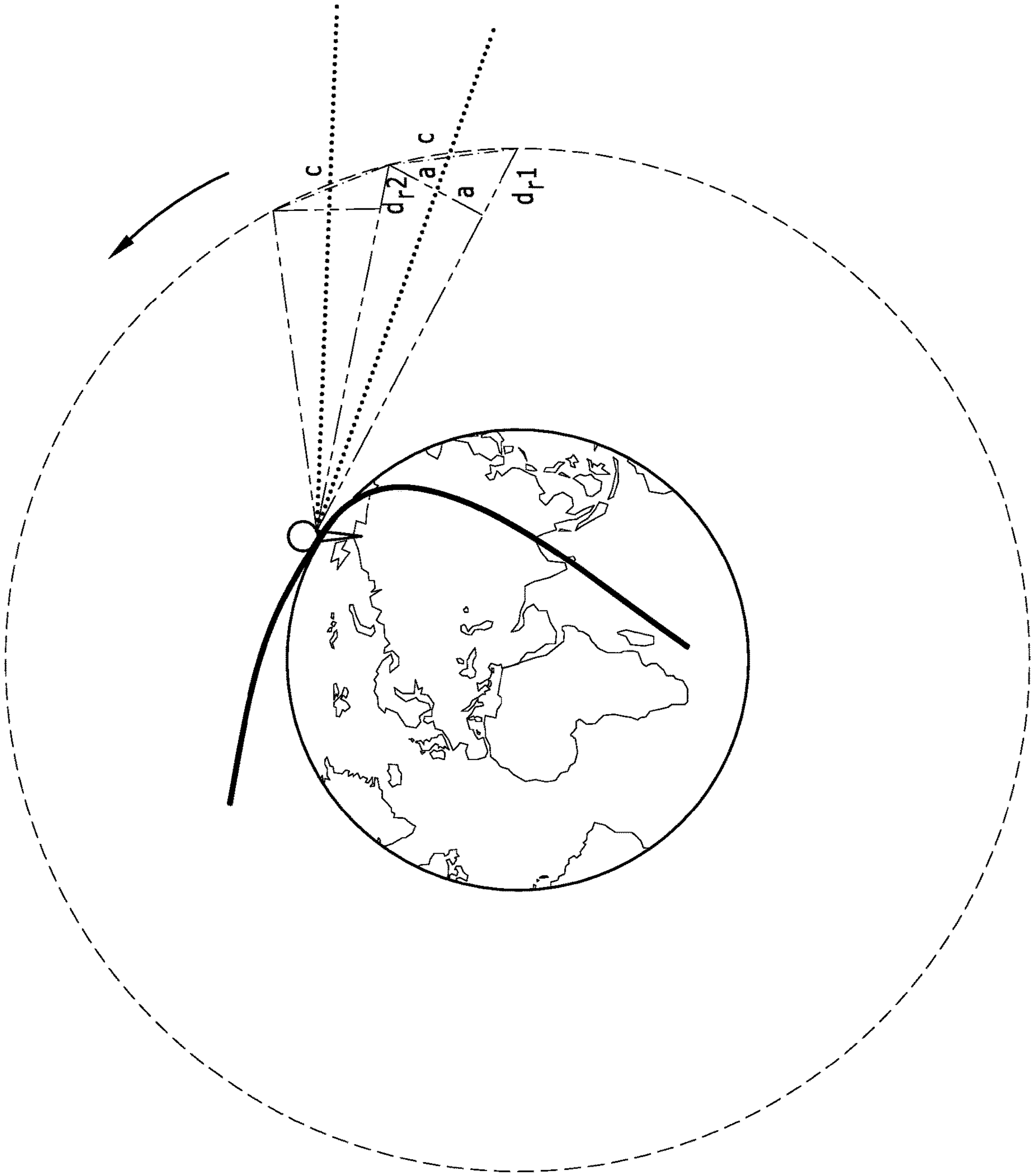
FIG. 2 is a conceptual illustration of a device and a movement of a satellite, in accordance with various embodiments of the disclosure.

Referring to FIG. 2, a conceptual illustration of the device 110 and a movement of the satellite 120, in accordance with various embodiments of the disclosure is shown. The satellite 120 may revolve around the earth in a predetermined orbit. Some non-limiting examples of the orbits include geostationary orbit and geosynchronous orbit. The satellite 120 may be visible to the device 110 only for a limited time period and only in a limited part of a sky visible to the device 110.

In many embodiments, the satellite 120 may have a predetermined antenna aperture. The antenna aperture may indicate a region on the earth's surface that the satellite antenna can cover. Since the device 110 is stationary, a change in position of the satellite 120 may indicate a distance travelled by the satellite. The device 110 can estimate a set of possible locations of the device 110 based at least on the change in the position of the satellite 120 and the GNSS data received from the satellite 120. In some embodiments, the distance travelled by the satellite corresponds to a constant pseudo range difference observed from the set of possible locations of the device 110. Based on the earth's shape and geometry, the set of possible locations can form a hyperbola. That is, the device 110 can be located on one of the locations on the hyperbola.

Although a specific embodiment for the device 110 and the satellite 120 suitable for carrying out the various steps, processes, methods, and operations described herein is discussed with respect to FIG. 2, any of a variety of systems and/or processes may be utilized in accordance with embodiments of the disclosure. In many examples, the device 110 may determine a hyperbola of locations on the earth's surface on which the device 110 may be located. The elements depicted in FIG. 1 may also be interchangeable with other elements of FIG. 1 and FIGS. 3-12 as required to realize a particularly desired embodiment.

Figure 3:
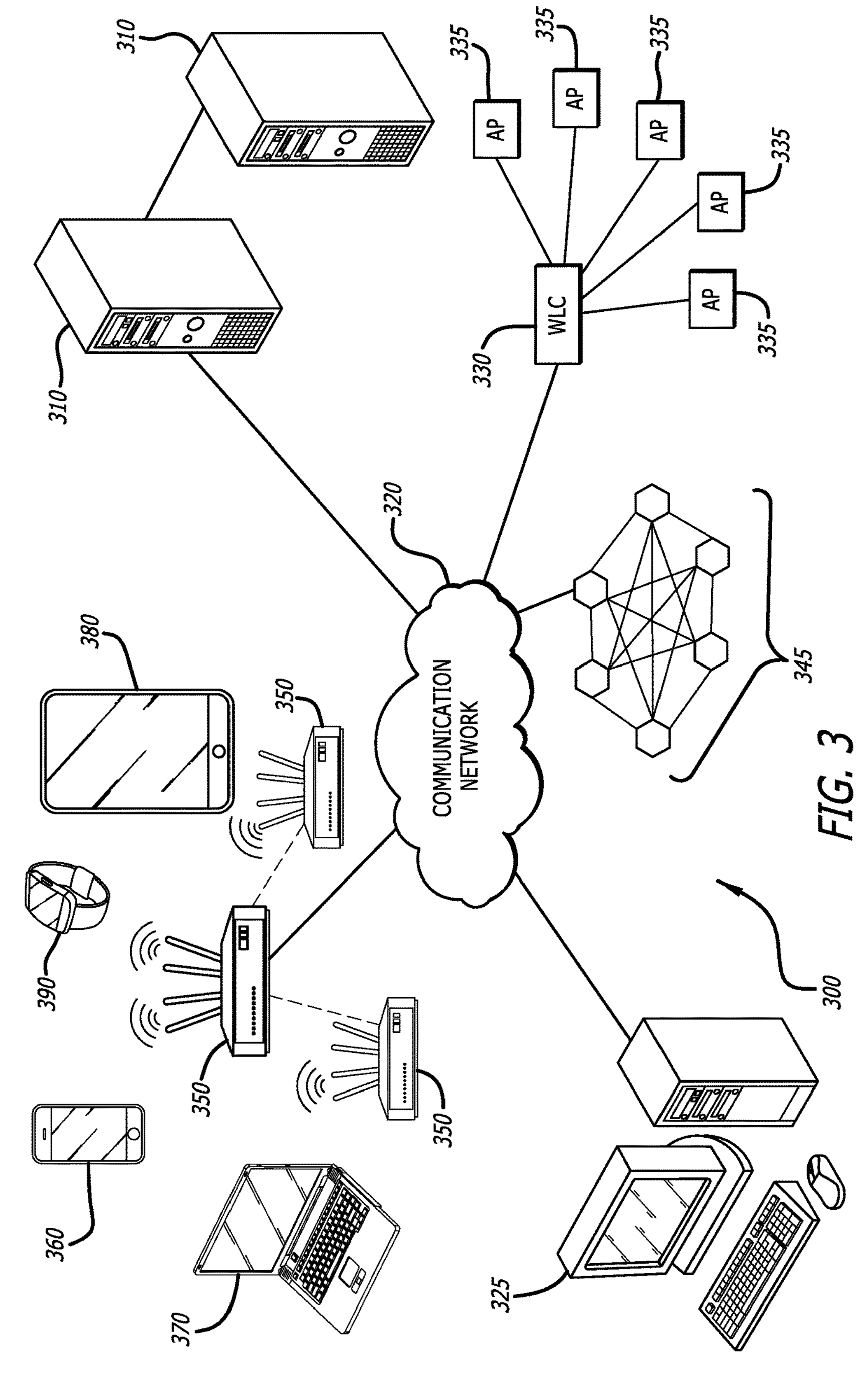
FIG. 3 is a conceptual network diagram of various environments that a regional position estimator may operate on a plurality of network devices, in accordance with various embodiments of the disclosure.

Referring to FIG. 3, a conceptual network diagram 300 of various environments that a regional position estimator may operate on a plurality of network devices, in accordance with various embodiments of the disclosure is shown. Those skilled in the art will recognize that the regional position estimator can be comprised of various hardware and/or software deployments and can be configured in a variety of ways. In many embodiments, the regional position estimator can be configured as a standalone device, exist as a logic in another network device, be distributed among various network devices operating in tandem, or remotely operated as part of a cloud-based network management tool. In further embodiments, one or more servers 310 can be configured with or otherwise operate the regional position estimator. In many embodiments, the regional position estimator may operate on one or more servers 310 connected to a communication network 320. The communication network 320 can include wired networks or wireless networks. In many embodiments, the communication network 320 may be a Wi-Fi network operating on various frequency bands, such as, 2.4 GHz, 5 GHZ, or 6 GHz. The operating frequency of the devices connected to the communication network 320 can differ in different places. For instance, each country may have different regulations for the operating frequency of the devices connected to the communication network 320 as well as an output power of devices. In further embodiments, the regional position estimator operating on the servers 310 determines the location of the devices and configures the devices to operate at frequencies and output powers based on the location. The regional position estimator can be provided as a cloud-based service that can service remote networks, such as, but not limited to a deployed network 340. In many embodiments, the regional position estimator can be a logic that determines the location of one or more devices based on the signals received by the devices.

However, in additional embodiments, the regional position estimator may be operated as a distributed logic across multiple network devices. In the embodiment depicted in FIG. 3, a plurality of network access points (APs) 350 can operate as the regional position estimator in a distributed manner or may have one specific device operate as the regional position estimator for all of the neighboring or sibling APs 350. The APs 350 can determine the location and configure the operating frequency and the output power based on the location. The APs 350 facilitate Wi-Fi connections for various electronic devices, such as but not limited to mobile computing devices including laptop computers 370, cellular phones 360, portable tablet computers 380 and wearable computing devices 390.

In further embodiments, the regional position estimator may be integrated within another network device. In the embodiment depicted in FIG. 3, a wireless LAN controller (WLC) 330 may have an integrated regional position estimator that the WLC 330 can use to control operating frequency and power of Wi-Fi communication within the various APs 335 that the WLC 330 is connected to, either wired or wirelessly. In many embodiments, the APs 335 can query the integrated WLC 330. In response, the WLC 330 may determine the location of the APs 335 and configure the APs 335 to operate on the operating frequency and the output power based on the location. In still more embodiments, a personal computer 325 may be utilized to access and/or manage various aspects of the regional position estimator, either remotely or within the network itself. In the embodiment depicted in FIG. 3, the personal computer 325 communicates over the communication network 320 and can access the regional position estimator of the servers 310, or the network APs 350, or the WLC 330.

Although a specific embodiment for various environments that the regional position estimator of may operate on a plurality of network devices suitable for carrying out the various steps, processes, methods, and operations described herein is discussed with respect to FIG. 3, any of a variety of systems and/or processes may be utilized in accordance with embodiments of the disclosure. In many non-limiting examples, the regional position estimator may be provided as a device or software separate from the APs or the regional position estimator may be integrated into the APs 350. The elements depicted in FIG. 3 may also be interchangeable with other elements of FIGS. 1-2 and 4-12 as required to realize a particularly desired embodiment.

Figure 4:
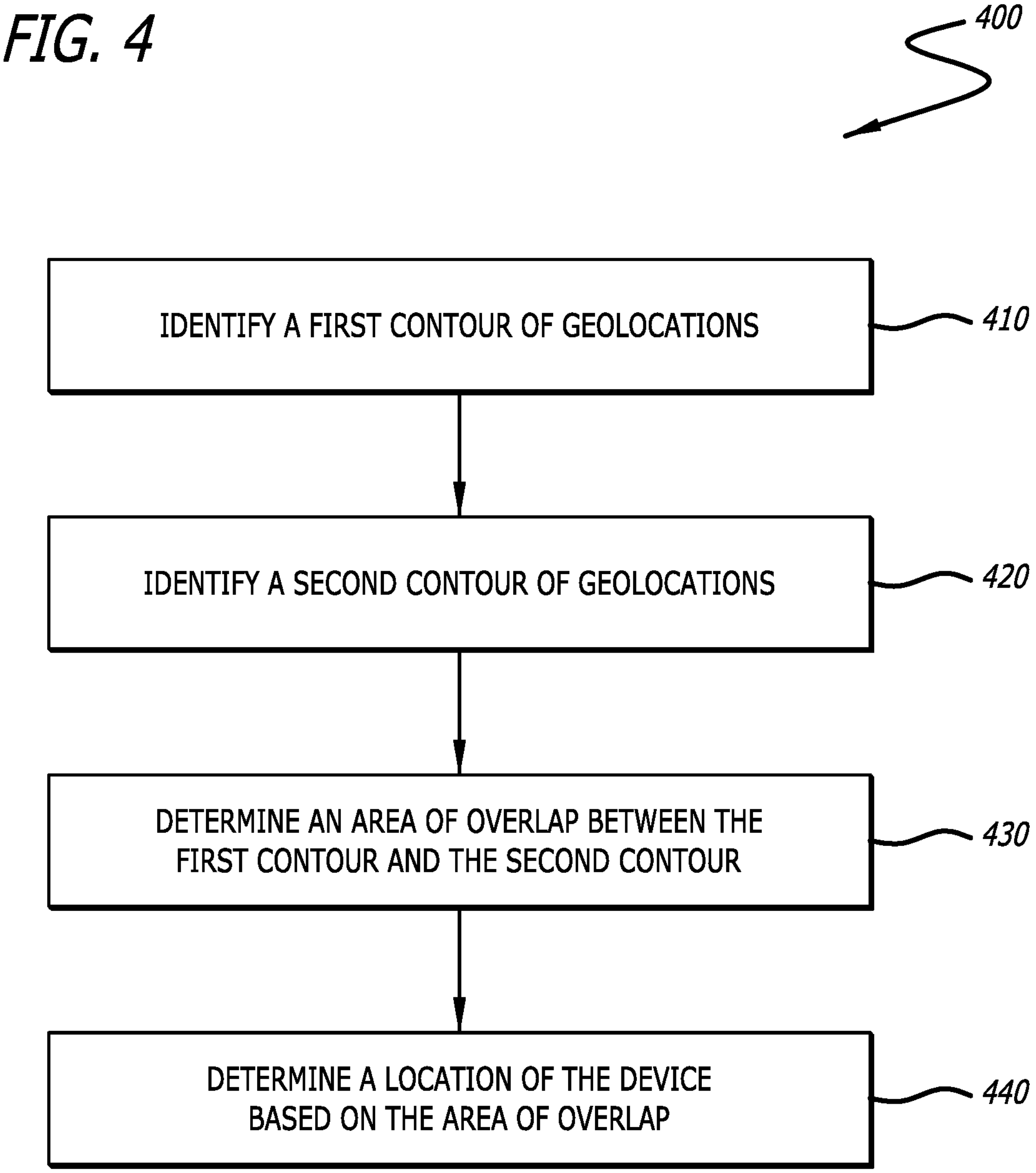
FIG. 4 is a flowchart depicting a process for determining a location of a device, in accordance with various embodiments of the disclosure.

Referring now to FIG. 4, a flowchart depicting a process 400 for determining a location of a device, in accordance with various embodiments of the disclosure is shown. In many embodiments, the process 400 may identify a first contour of geolocations (block 410). In some embodiments, the first contour of geolocations can be a first set of locations on the earth's surface that have first pseudo range difference from a first satellite in a first time period. In certain embodiments, the first contour may be a first hyperbola. In some more embodiments, a precision of the first pseudo range difference determines a width of the first hyperbola, for instance, multiple pseudo range differences from the first satellite can narrow the width of the first hyperbola. Conversely, in numerous embodiments, fewer pseudo range differences from the first satellite may produce a wider first hyperbola.

In a number of embodiments, the process 400 can identify a second contour of geolocations (block 420). In some embodiments, the second contour of geolocations can be a second set of locations on the earth's surface that have a second pseudo range difference from a second satellite in a second time period. In certain embodiments, the second contour may be a second hyperbola. In some more embodiments, a precision of the second pseudo range difference determines a width of the second hyperbola, for instance, multiple pseudo range differences from the second satellite can narrow the width of the second hyperbola. Conversely, in numerous embodiments, fewer pseudo range differences from the second satellite may produce a wider second hyperbola.

In various embodiments, the process 400 may determine an area of overlap between the first contour and the second contour (block 430). In some embodiments, the area of overlap of the first hyperbola and the second hyperbola can form an ellipse. In certain embodiments, a size of the ellipse varies based on the widths of the first and second hyperbolas.

In additional embodiments, the process 400 can determine a location of the device based on the area of overlap (block 440). In some embodiments, the location of the ellipse formed by the area of overlap may indicate a geographical region, such as, a city, a state, or a country that the device is located in. In certain embodiments, based on the geographical region, the process 400 can further configure the device to operate on frequencies and output power corresponding to the regulations governing the indicated geographical region. In some more embodiments, in case the ellipse indicates more than one geographical region, one or more of the processes depicted in FIGS. 9-11 can be used to further refine the location of the device.

In further embodiments, the first contour and the second contour, or the first hyperbola and the second hyperbola, may be distorted due to lack of knowledge of an altitude of the device, clock drift, or atmospheric variations. In some embodiments, the area of overlap can form the ellipse in which demi-major-axis (dma) length depends on the number of GNSS measurements that the device can collect before the satellite moves out of range. In certain embodiments, with a higher number of GNSS measurements, the dma of the ellipse can be reduced to accurately determine the location of the device.

Although a specific embodiment for determining the location of the device for carrying out the various steps, processes, methods, and operations described herein is discussed with respect to FIG. 4, any of a variety of systems and/or processes may be utilized in accordance with embodiments of the disclosure. In many non-limiting examples, the process 400 can determine the location of the device based on the GNSS data received from the first satellite and the second satellite. The elements depicted in FIG. 4 may also be interchangeable with other elements of FIGS. 1-3 and 5-12 as required to realize a particularly desired embodiment.

Figure 5:
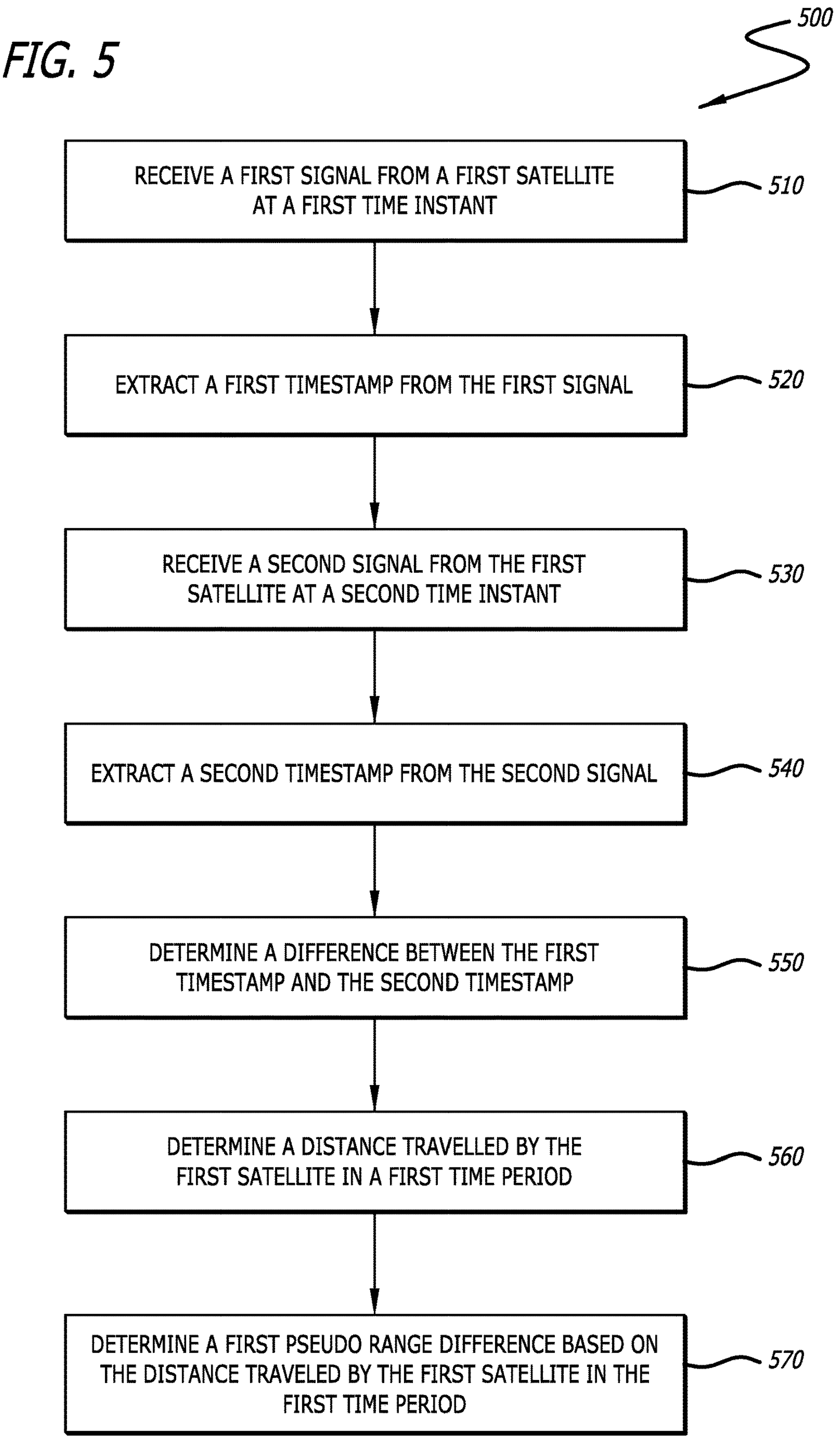
FIG. 5 is a flowchart depicting a process for determining a first pseudo range difference, in accordance with various embodiments of the disclosure.

Referring now to FIG. 5, a flowchart depicting a process 500 for determining the first pseudo range difference, in accordance with various embodiments of the disclosure is shown. In many embodiments, the process 500 may receive a first signal from the first satellite at a first time instant (block 510). In some embodiments, the first signal may include GNSS data corresponding to the first satellite. In certain embodiments, the first signal may include the GNSS data, such as a first pseudo random code, navigation data, a first satellite identifier of the first satellite, almanac data, or a first ephemeris data corresponding to the first satellite. In some more embodiments, the process 500 can identify the first satellite based on the first satellite identifier and can determine a location of the first satellite at the first time instant based on the first ephemeris data. In numerous embodiments, the process 500 can store the GNSS data corresponding to the first satellite in the memory of the device.

In a number of embodiments, the process 500 can extract a first timestamp from the first signal (block 520). In some embodiments, the first timestamp may indicate a time when the first signal was transmitted from the first satellite to the device. In certain embodiments, since the device receives the first timestamp after a certain amount of delay, the process 500 can determine a first pseudo range of the device from the first satellite. In some more embodiments, the process 500 may determine the first pseudo range based on a speed of light and a difference between a time of transmission of the first signal by the first satellite and a time of reception of the first signal by the device.

In various embodiments, the process 500 can receive a second signal from the first satellite (530) at a second time instant. In some embodiments, the second signal may include the updated GNSS data corresponding to the first satellite. In certain embodiments, the updated GNSS data corresponding to the first satellite may include a second pseudo random code, navigation data, a first satellite identifier of the first satellite, almanac data, or a second ephemeris data corresponding to the updated position of the first satellite. In some more embodiments, the process 500 can determine updated location of the first satellite at the second time instant based on the updated GNSS data. In numerous embodiments, the process 500 can store the updated GNSS data corresponding to the first satellite in the memory of the device.

In additional embodiments, the process 500 may extract the second timestamp from the second signal (block 540). In some embodiments, the second timestamp may indicate a time when the second signal was transmitted from the first satellite to the device. In certain embodiments, since the device receives the second timestamp after the certain amount of delay, the process 500 can determine a second pseudo range of the device from the first satellite. In some more embodiments, the process 500 may determine the second pseudo range based on the speed of light and a difference between a time of transmission of the second signal by the first satellite and a time of reception of the second signal by the device.

In further embodiments, the process 500 may determine a difference between the first timestamp and the second time stamp (block 550). In some embodiments, the difference between the first time instant and the second time instant may correspond to a first time period. In certain embodiments, the first time period may be indicative of a duration of a time for which the first satellite is visible to the device.

In many more embodiments, the process 500 can determine a distance travelled by the first satellite in the first time period (block 560). In some embodiments, the process 500 may extract information about a speed of the first satellite from the navigation data received from the first satellite. In certain embodiments, since the device is stationary during the first time period, the process 500 may determine the distance travelled by the first satellite in the first time period based on the speed of the first satellite.

In many additional embodiments, the process 500 can determine difference between the first pseudo range and the second pseudo range as a first pseudo range difference (block 570). In some embodiments, the first pseudo range difference may correspond to the first time period. In certain embodiments, the first contour may be associated with the first pseudo range difference. In some more embodiments, the first contour or the first hyperbola can indicate all the points on the surface of the earth that observe the first pseudo range difference from the first satellite in the first time period.

Although a specific embodiment for determining the first pseudo range difference for carrying out the various steps, processes, methods, and operations described herein is discussed with respect to FIG. 5, any of a variety of systems and/or processes may be utilized in accordance with embodiments of the disclosure. In many non-limiting examples, the process 500 can determine the first contour or the first hyperbola indicative of all the locations that observe the first pseudo range difference from the first satellite in the first time period. The elements depicted in FIG. 5 may also be interchangeable with other elements of FIGS. 1-4 and 6-12 as required to realize a particularly desired embodiment.

Figure 6:
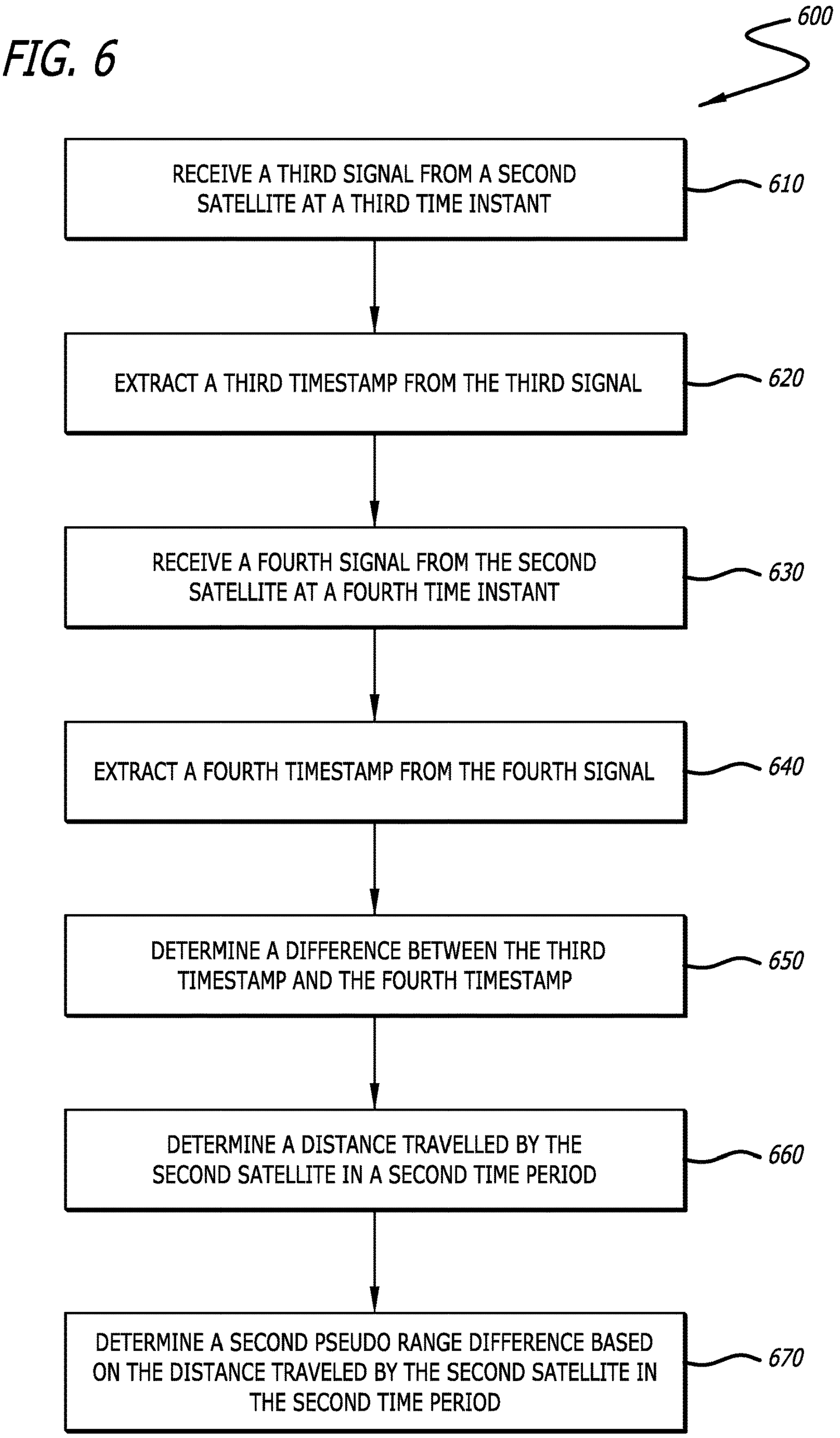
FIG. 6 is a flowchart depicting a process for determining a second pseudo range difference, in accordance with various embodiments of the disclosure.

Referring now to FIG. 6, a flowchart depicting a process 600 for determining a second pseudo range difference in accordance with various embodiments of the disclosure is shown. In many embodiments, the process 600 may receive a third signal from the second satellite at a third time instant (block 610). In some embodiments, the third signal may include the GNSS data corresponding to the second satellite. In certain embodiments, the third signal may include the GNSS data such as a third pseudo random code, navigation data, a second satellite identifier of the second satellite, almanac data, or a third ephemeris data corresponding to the second satellite. In some more embodiments, the process 600 can identify the second satellite based on the second satellite identifier and can determine a location of the second satellite at the second time instant based on the second ephemeris data. In numerous embodiments, the process 600 can store the GNSS data corresponding to the second satellite in the memory of the device.

In a number of embodiments, the process 600 can extract a third timestamp from the third signal (block 620). In some embodiments, the third timestamp may indicate a time when the third signal was transmitted from the second satellite to the device. In certain embodiments, since the device receives the third timestamp after a certain amount of delay, the process 600 can determine a third pseudo range of the device from the second satellite. In some more embodiments, the process 600 may determine the third pseudo range based on the speed of light and a difference between a time of transmission of the third signal by the second satellite and a time of reception of the third signal by the device.

In various embodiments, the process 600 can receive a fourth signal from the second satellite (630) at a fourth time instant. In some embodiments, the fourth signal may include the updated GNSS data corresponding to the second satellite. In certain embodiments, the updated GNSS data corresponding to the second satellite may include a fourth pseudo random code, navigation data, a second satellite identifier of the second satellite, almanac data, or a fourth ephemeris data corresponding to the updated position of the second satellite. In some more embodiments, the process 600 can determine updated location of the second satellite at the second time instant based on the updated GNSS data. In numerous embodiments, the process 600 can store the updated GNSS data corresponding to the second satellite in the memory of the device.

In additional embodiments, the process 600 may extract the fourth timestamp from the fourth signal (block 640). In some embodiments, the fourth timestamp may indicate a time when the fourth signal was transmitted from the second satellite to the device. In certain embodiments, since the device receives the fourth timestamp after the certain amount of delay, the process 600 can determine a fourth pseudo range of the device from the second satellite. In some more embodiments, the process 600 may determine the fourth pseudo range based on the speed of light and a difference between a time of transmission of the fourth signal by the second satellite and a time of reception of the fourth signal by the device.

In further embodiments, the process 600 may determine a difference between the third timestamp and the fourth time stamp (block 650). In some embodiments, the difference between the third time instant and the fourth time instant may correspond to a second time period. In certain embodiments, the second time period may be indicative of a duration of a time for which the second satellite is visible to the device.

In many more embodiments, the process 600 can determine a distance travelled by the second satellite in the second time period (block 660). In some embodiments, the process 600 may extract information about a speed of the second satellite from the navigation data received from the second satellite. In certain embodiments, since the device is stationary during the second time period, the process 600 may determine the distance travelled by the second satellite in the second time period based on the speed of the second satellite.

In many additional embodiments, the process 600 can determine difference between the third pseudo range and the fourth pseudo range as a second pseudo range difference (block 670). In some embodiments, the second pseudo range difference may correspond to the second time period. In certain embodiments, the second contour may be associated with the second pseudo range difference. In numerous embodiments, the second contour or the second hyperbola can indicate all the points on the surface of the earth that observe the second pseudo range difference from the second satellite in the second time period.

Although a specific embodiment for determining the second pseudo range difference for carrying out the various steps, processes, methods, and operations described herein is discussed with respect to FIG. 6, any of a variety of systems and/or processes may be utilized in accordance with embodiments of the disclosure. In many non-limiting examples, the process 600 can determine the second contour or the second hyperbola indicative of all the locations that observe the second pseudo range difference from the second satellite in the second time period. The elements depicted in FIG. 6 may also be interchangeable with other elements of FIGS. 1-5 and 7-12 as required to realize a particularly desired embodiment.

Figure 7:
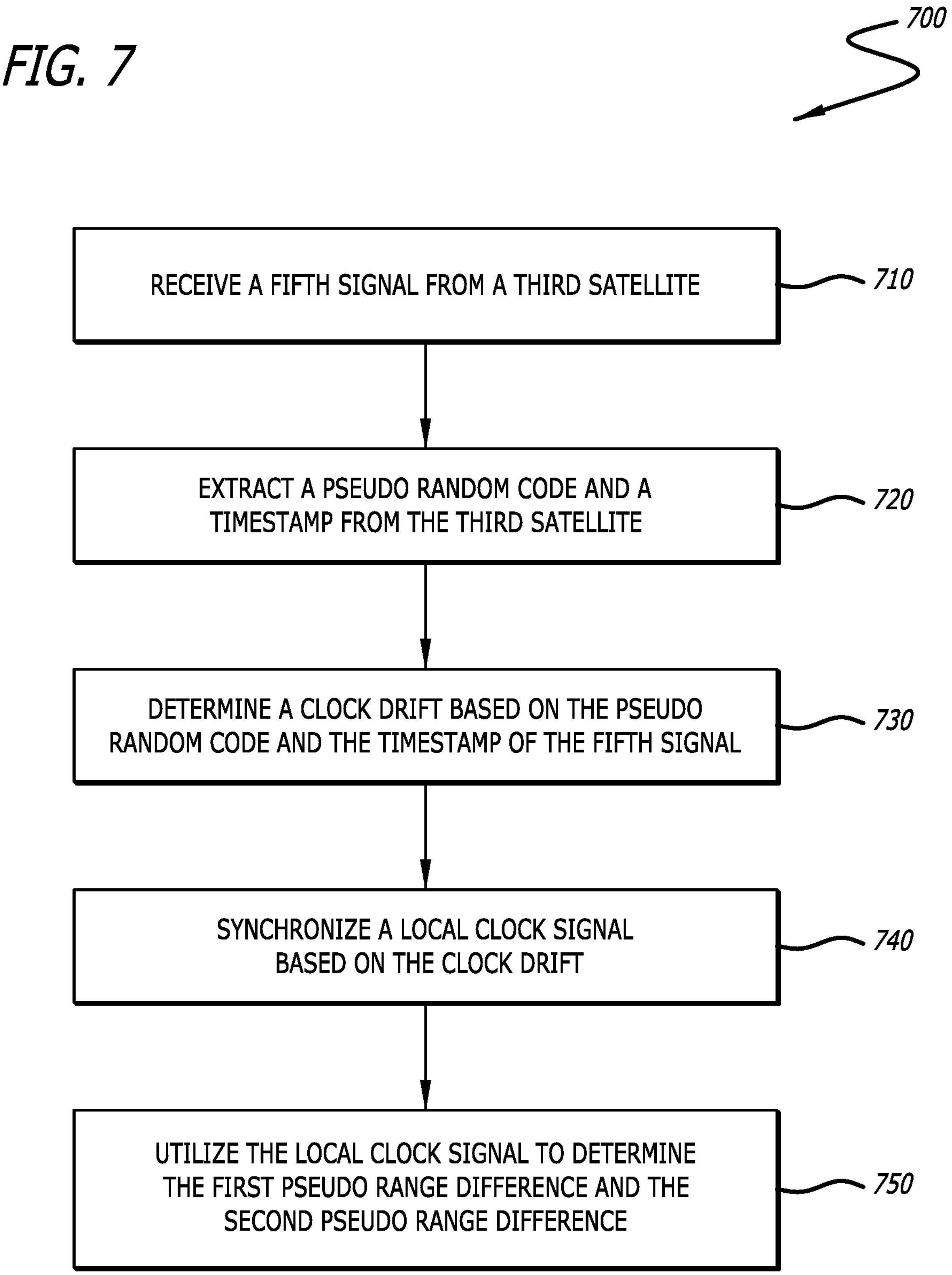
FIG. 7 is a flowchart depicting a process for synchronizing a local clock signal, in accordance with various embodiments of the disclosure.

Referring to FIG. 7, a flowchart depicting a process 700 for synchronizing a local clock signal, in accordance with various embodiments of the disclosure is shown. In many embodiments, the process 700 can receive a fifth signal from a third satellite at a fifth time instant (block 710). In some embodiments, the first signal may include GNSS data corresponding to the third satellite. In certain embodiments, the fifth signal may include the GNSS data such as a fifth pseudo random code, navigation data, a third satellite identifier of the third satellite, almanac data, or a fifth ephemeris data corresponding to the third satellite.

In a number of embodiments, the process 700 may extract the fifth pseudo random code from the fifth signal (block 720). In some embodiments, the process 700 may also extract a fifth timestamp from the fifth signal. In certain embodiments, the fifth timestamp may indicate a time when the fifth signal was transmitted from the third satellite to the device. In some more embodiments, since the device receives the fifth timestamp after a certain amount of delay, the process 700 can determine a fifth pseudo range of the device from the third satellite.

In various embodiments, the process 700 can determine a clock drift based on the fifth pseudo random code and the fifth timestamp (block 730). In some embodiments, a clock of the GNSS receiver of the device may experience a drift because of multiple reasons, such as, lack of precision in time keeping, or erroneous pseudo range measurements etc. In certain embodiments, to determine an amount of the clock drift, the process 700 may compare a rate of the fifth pseudorandom code with a predetermined rate. In some more embodiments, the process 700 can correlate locally generated pseudorandom code with the fifth pseudorandom code received retrieved from the fifth signal. In numerous embodiments, when the locally generated pseudorandom code aligns well with the fifth pseudorandom code, a correlation peak may occur. In many further embodiments, a time position of the correlation peak can indicate the time delay in the clock of the GNSS receiver. In still more embodiments, the process 700 may also generate a correction value or an offset based on the correlation. In many additional embodiments, the correction value can correspond to the delay in the clock of the GNSS receiver due to the clock drift.

In additional embodiments, the process 700 can further determine the clock drift based on the difference in the rate of the fifth pseudo random code and the predetermined rate. In some embodiments, the process 70 may also determine the clock drift based on the fifth pseudo range. In certain embodiments, the clock drift can be a positive clock drift or a negative clock drift. In some more embodiments, the fifth satellite operates on an atomic clock.

In further embodiments, the process 700 may synchronize a local clock signal based on the clock drift (block 740). In some embodiments, the process 700 may synchronize a local clock crystal based on the clock drift. As will be understood by a person skilled in the art, the local clock signal of the device may deviate from an ideal reference time over a period of time because of many reasons. In certain embodiments, the clock drift may introduce errors in accuracy of positioning, navigation, or timing information. Therefore, it is essential to correct the clock drift to maintain accuracy of positioning. In some more embodiments, the process 700 may synchronize the lock clock signal with a satellite clock signal of the third satellite based on the clock drift. In numerous embodiments, when the local clock signal is synchronized with the satellite clock of the third satellite, the accuracy of the determination of the location by the device is improved.

In many more embodiments, the process 700 can utilize the local clock signal to determine the first pseudo range difference and the second pseudo range difference (block 750). In some embodiments, the third satellite can be distinct from the first satellite and the second satellite. In certain embodiments, the third satellite may be same as the first satellite or the second satellite, that is, the process 700 may use the first satellite or the second satellite to determine the clock drift. As will be understood by a person skilled in the art, each of the first through third satellites may provide stable timekeeping by utilizing atomic clocks for synchronization.

Although a specific embodiment for synchronizing the local clock signal for carrying out the various steps, processes, methods, and operations described herein is discussed with respect to FIG. 7, any of a variety of systems and/or processes may be utilized in accordance with embodiments of the disclosure. In many non-limiting examples, the process 700 can determine the clock drift and calibrate the local clock signal based on the clock drift, thereby synchronizing the local clock signal of the device with the satellite clock of the third satellite. The elements depicted in FIG. 7 may also be interchangeable with other elements of FIGS. 1-6 and 8-12 as required to realize a particularly desired embodiment.

Figure 8:
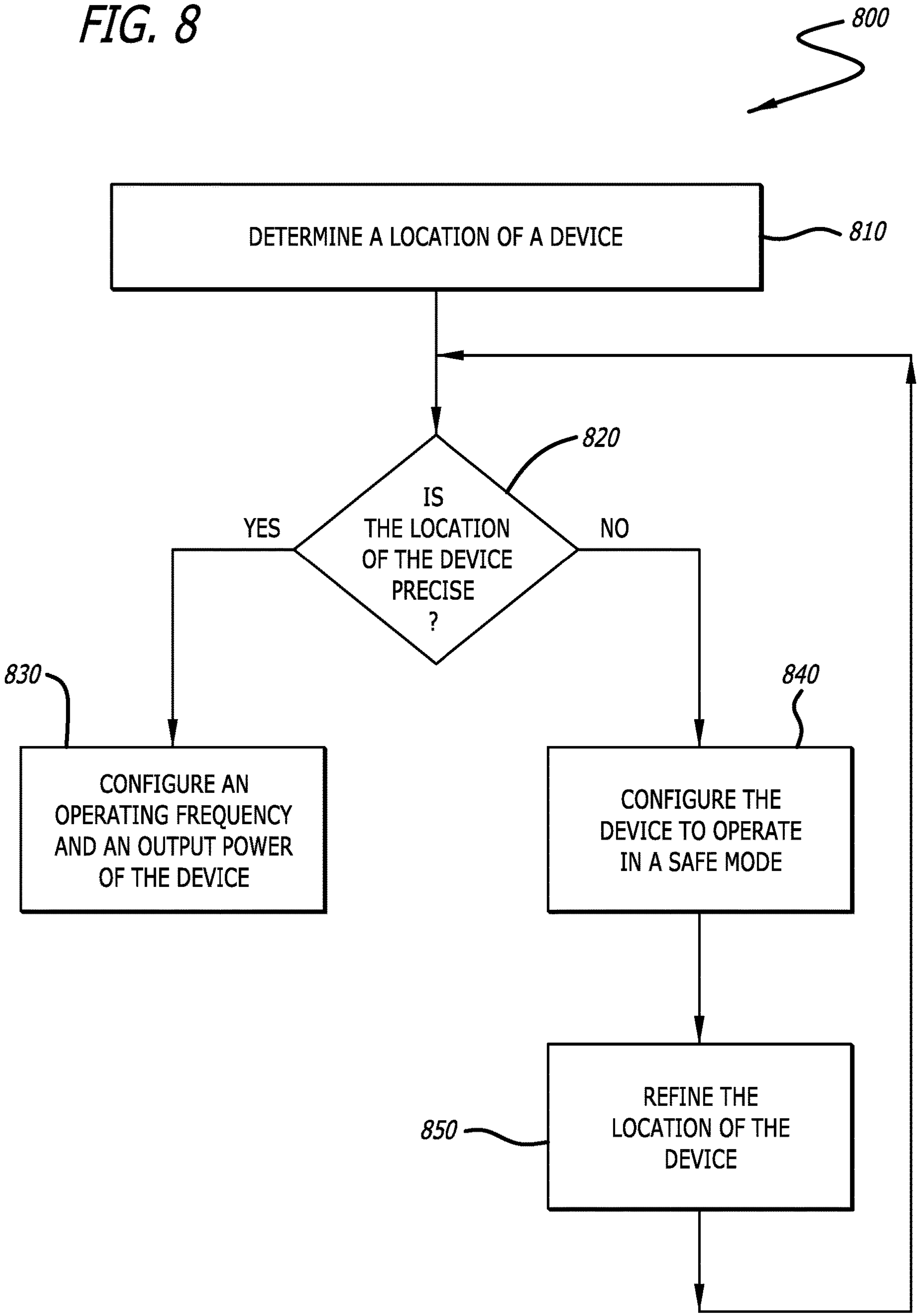
FIG. 8 is a flowchart depicting a process for configuring an operating frequency and an output power of a device, in accordance with various embodiments of the disclosure.

Referring now to FIG. 8, a flowchart depicting a process 800 for configuring the operating frequency and the output power of a device, in accordance with various embodiments of the disclosure is shown. In many embodiments, the process 800 can determine the location of the device (block 810). In some embodiments, the process 800 may determine the location of the device based on the area of overlap of the first contour and the second contour. In certain embodiments, the precision of the location can depend on the area of overlap, and consequently, on accuracy of the first pseudo range difference and the second pseudo range difference.

In a number of embodiments, the process 800 may determine if the location of the device is precise (block 820). In some embodiments, the area of overlap may include a geographical region, such as the city, state, or country that the device is located in, thereby precisely locating the device. In certain embodiments, the area of overlap can indicate more than one geographical region, thereby failing to precisely locate the device. In some more embodiments, the process 800 may check whether the area of overlap precisely identifies the location of the device.

In various embodiments, if the process 800 can precisely determine the location of the device, the process 800 may configure the device to operate on the operating frequency and the output power corresponding to the identified location (block 830). In some embodiments, each country may have different regulations for the operating frequency of the devices connected to the internet. In certain embodiments, the process 800 may configure the device to operate as per the regulations of the identified country corresponding to the geographical area of the device.

In additional embodiments, if the process 800 does not precisely determine the location of the device, the process 800 may configure the device to operate in a safe mode (block 840). In some embodiments, the safe mode of operation of the device may include a subset of frequencies and output power levels that are allowed by all regulatory domains. In certain embodiments, the process 800 may configure the device to operate in the safe mode until the precise location of the device is determined. In some more embodiments, after the precise location of the device is determined, the process 800 may further configure the device to operate as per the regulations corresponding to the geographical region of the device.

In further embodiments, the process 800 can refine the location of the device (block 850). In some embodiments, the location of the device can be refined using one or more processes as will be further described in FIGS. 9-11. In certain embodiments, after refining the location of the device, the process 800 may again check if the location of the device is precise enough to configure the operating frequency and the output power of the device.

Although a specific embodiment for configuring the operating frequency and the output power for carrying out the various steps, processes, methods, and operations described herein is discussed with respect to FIG. 8, any of a variety of systems and/or processes may be utilized in accordance with embodiments of the disclosure. In many non-limiting examples, the process 800 may check whether the location of the device is precise enough to configure the device, and refine the location of the device until the location of the device is determined precisely. The elements depicted in FIG. 8 may also be interchangeable with other elements of FIGS. 1-7 and 9-12 as required to realize a particularly desired embodiment.

Figure 9:
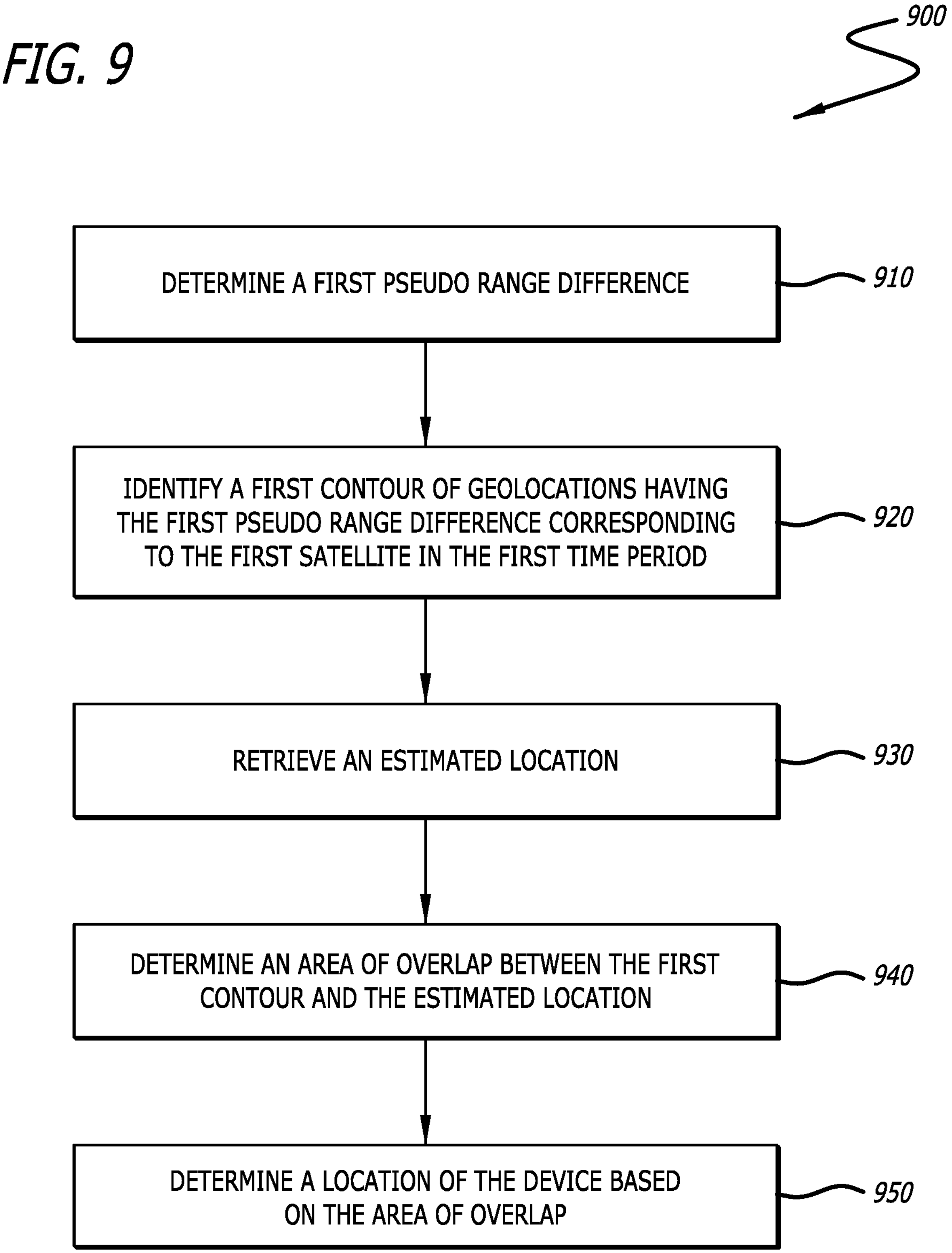
FIG. 9 is a flowchart depicting a process for determining a location of a device based on an area of overlap, in accordance with various embodiments of the disclosure.

Referring now to FIG. 9, a flowchart depicting a process 900 for determining a location of the device based on the area of overlap in accordance with various embodiments of the disclosure is shown. In many embodiments, the process 900 may determine the first pseudo range difference (block 910). In some embodiments, the first pseudo range difference can be determined based on the first signal and the second signal received from the first satellite at the first time instant and the second time instant, respectively. In certain embodiments, the first pseudo range difference can correspond to the first satellite observed in the first time period.

In a number of embodiments, the process 900 can identify the first contour based on the first pseudo range difference (block 920). In some embodiments, the first contour may include all the locations on the surface of the earth that will observe the first pseudo range difference for the first satellite during the first time period. In certain embodiments, the first contour may form the first hyperbola. In some more embodiments, the device can be located on one of the locations on the first contour or the first hyperbola.

In various embodiments, the process 900 may retrieve an estimated location from one or more databases (block 930). In some embodiments, the estimated location can also be the second contour obtained from the second pseudo range difference corresponding to the second satellite in the second time period. In certain embodiments, the estimated location can also be determined by the process 900 based on further observations of more satellites.

In additional embodiments, the process 900 may determine the area of overlap of the first contour and the estimated location (block 940). In some embodiments, the area of overlap may correspond to a geographical location on the earth, for instance, a city or a country. In certain embodiments, the precision of the area of overlap may depend on a precision of the estimated location.

In further embodiments, the process 900 can determine the location of the device (block 950). In some embodiments, the process 900 may determine the location of the device based on the area of overlap between the first contour and the estimated location. In certain embodiments, the estimated location can be determined by one or more processes as described in FIGS. 10-11.

Although a specific embodiment for determining the location of the device for carrying out the various steps, processes, methods, and operations described herein is discussed with respect to FIG. 9, any of a variety of systems and/or processes may be utilized in accordance with embodiments of the disclosure. In many non-limiting examples, the process 900 can determine the location of the device based on the estimated location, wherein the estimated location can be retrieved in one or more than one way. The elements depicted in FIG. 9 may also be interchangeable with other elements of FIGS. 1-8 and 10-12 as required to realize a particularly desired embodiment.

Figure 10:
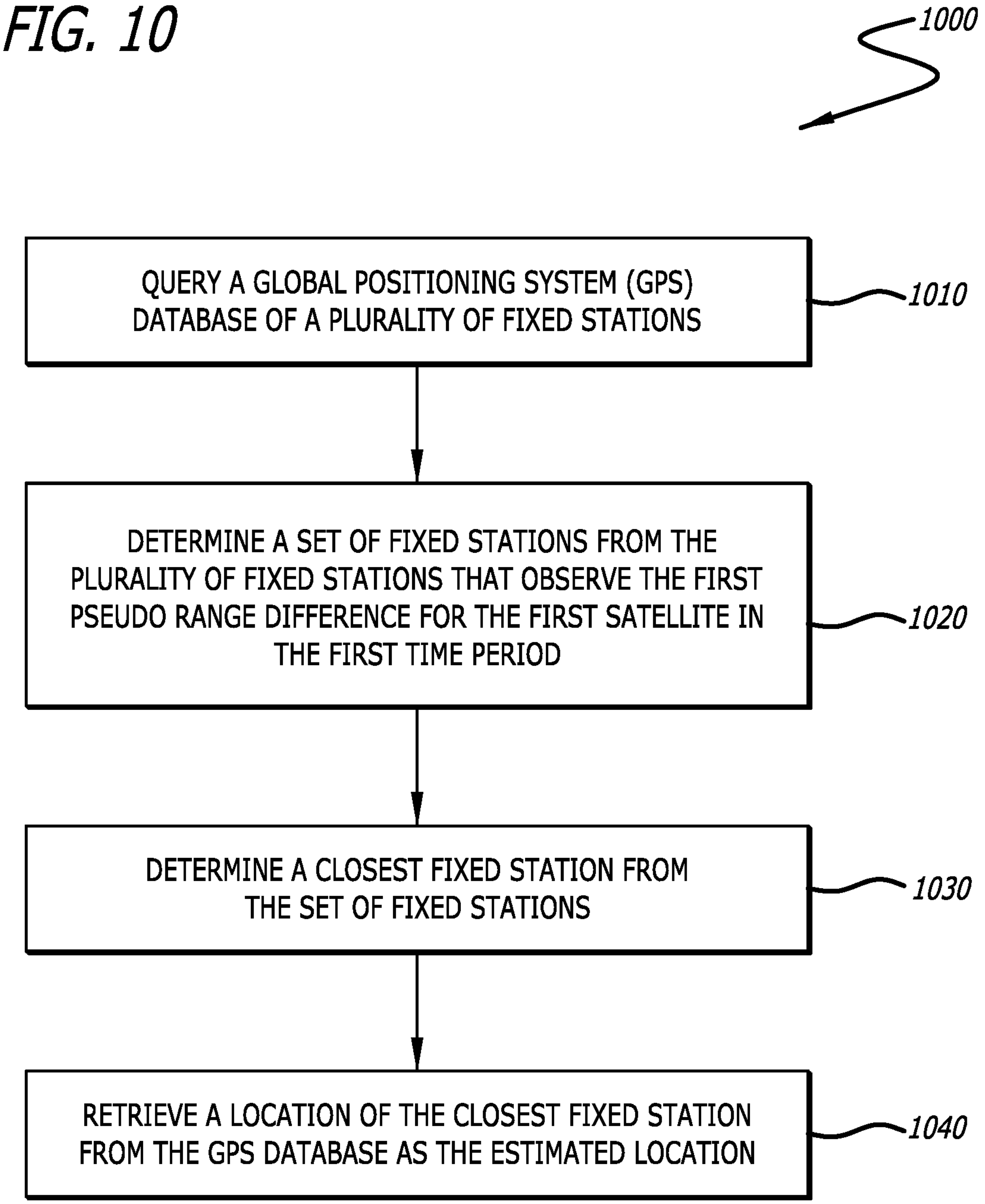
FIG. 10 is a flowchart depicting a process for determining a location of a device, in accordance with various embodiments of the disclosure.

Referring to FIG. 10, a flowchart depicting a process 1000 for determining a location of a device in accordance with various embodiments of the disclosure is shown. In many embodiments, the process 1000 may query a Global Positioning System (GPS) database of a plurality of fixed stations (block 1010). In some embodiments, the process 1000 can also query specialized databases such as Antenna Structure Registration (ASR) Database maintained by the Federal Communications Commission (FCC) or List of Terrestrial Broadcasting Stations by International Telecommunication Union (ITU) etc. In certain embodiments, the process 1000 may query one or more databases based on the first pseudo range difference. In some more embodiments, fixed stations can include Continuously Operating Reference Stations (CORS), Plate Boundary Observatory (PBO), or International GNSS Service (IGS) etc.

In a number of embodiments, the process 1000 may determine a set of fixed stations from the plurality of fixed stations that observe the first pseudo range difference for the first satellite in the first time period (block 1020). In some embodiments, one or more fixed stations co-located or located near the device can observe the first pseudo range difference with respect to the first satellite in the first time period. In certain embodiments, since the device is stationary and the fixed stations are also stationary, the location of the device can be estimated to be at or near the set of fixed stations.

In various embodiments, the process 1000 can determine a closest fixed station from the set of fixed stations (block 1030). In that, the process 1000 may receive the set of fixed stations along with corresponding locations. In some embodiments, the process 1000 can compare the locations of the fixed stations with the locations on the first contour. In certain embodiments, the fixed stations that are closer to the first contour may be determined to be closer to the device.

In additional embodiments, the process 1000 may retrieve a geographical location of the closest fixed station as the estimated location (block 1040). In some embodiments, the estimated location can further be utilized by the process 1000 to determine the area of overlap between the first contour and the geographical location of the closest fixed station. In certain embodiments, the process 1000 can further determine the location of the device based on the area of overlap.

Although a specific embodiment for determining the estimated location for carrying out the various steps, processes, methods, and operations described herein is discussed with respect to FIG. 10, any of a variety of systems and/or processes may be utilized in accordance with embodiments of the disclosure. In many non-limiting examples, the process 1000 can retrieve the estimated location from the GPS database. The elements depicted in FIG. 10 may also be interchangeable with other elements of FIGS. 1-9 and 11-12 as required to realize a particularly desired embodiment.

Figure 11:
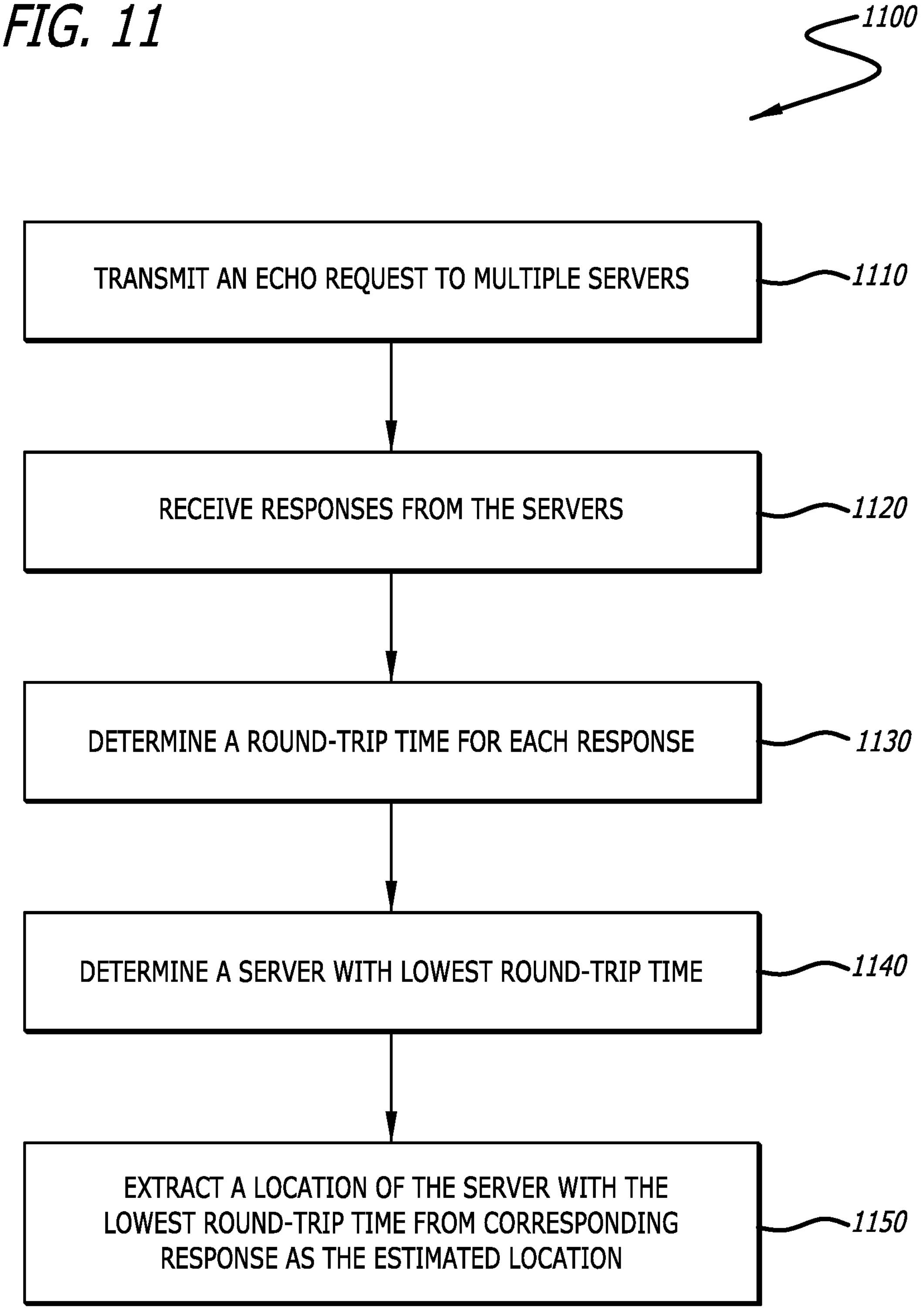
FIG. 11 is a flowchart depicting a process for determining a location of a device, in accordance with various embodiments of the disclosure.

Referring to FIG. 11, a flowchart depicting a process 1100 for determining a location of a device in accordance with various embodiments of the disclosure is shown. In many embodiments, the process 1100 may transmit an echo request to a plurality of servers (block 1110). In some embodiments, the process 1100 may use Internet Control Message Protocol (ICMP) to send an echo request, or ping, to multiple servers. In certain embodiments, the process 1100 can determine connectivity or reachability of the servers from the device.

In a number of embodiments, the process 1100 may receive an echo response from the servers (block 1120). In some embodiments, each echo response may include an identifier sent in corresponding echo request, thereby allowing the process 1100 to match the received response with the transmitted request. In certain embodiments, receiving a response from a server can indicate a successful communication between the device and the server.

In various embodiments, the process 1100 can determine a round-trip time (RTT) for every response (block 1130). In some embodiments, in ICMP ping, the time taken for an echo request to travel to the server and return as a response may define the RTT for the server. In certain embodiments, the RTT can often indicate network latency or congestion. In some more embodiments, the latency for a server closer to the device may be lesser than that for a server farther away from the device.

In additional embodiments, the process 1100 can extract a location of the server with the lowest RTT from corresponding response as the estimated location (block 1140). In some embodiments, the process 1100 may compare all the responses to determine the server that has the lowest RTT. In certain embodiments, the server with the lowest RTT may be the server that is located closest to the device. In some more embodiments, the process 1100 can extract the location of the closest server as the estimated location. In numerous embodiments, the estimated location can further be utilized by the process 1100 to determine the area of overlap between the first contour and the location of the closest server. In many further embodiments, the process 1100 can further determine the location of the device based on the area of overlap.

In further embodiments, the process 1100 can extract the estimated location from an Access Point (AP) database. In some embodiments, the APs database may be a crowd-sourced database of Service Set Identifier (SSIDs) or Basic Service Set Identifier (BSSIDs) of multiple APs. In certain embodiments, the process 1100 may use a location of a closest AP for retrieving the estimated location. In some more embodiments, when the device boots, the process 1100 can scan all frequency channels to detect SSIDs or BSSIDs connected to a Wireless LAN controller (WLC). In numerous embodiments, if the SSIDs or BSSIDs retrieved from the AP database match the SSIDs or BSSIDs connected to the WLC, the process 1100 may determine the location of the APs as the estimated location. In many further embodiments, if the location determined by the process 1100 does not match the location of the APs connected to the WLC, the process 1100 can report the location of the device to the WLC. In still more embodiments, the WLC may determine the location for all connected APs.

Although a specific embodiment for determining the estimated location for carrying out the various steps, processes, methods, and operations described herein is discussed with respect to FIG. 11, any of a variety of systems and/or processes may be utilized in accordance with embodiments of the disclosure. In many non-limiting examples, the process 1100 can retrieve the estimated location based on RTTs of the plurality of servers. The elements depicted in FIG. 11 may also be interchangeable with other elements of FIGS. 1-10 and 12 as required to realize a particularly desired embodiment.

Figure 12:
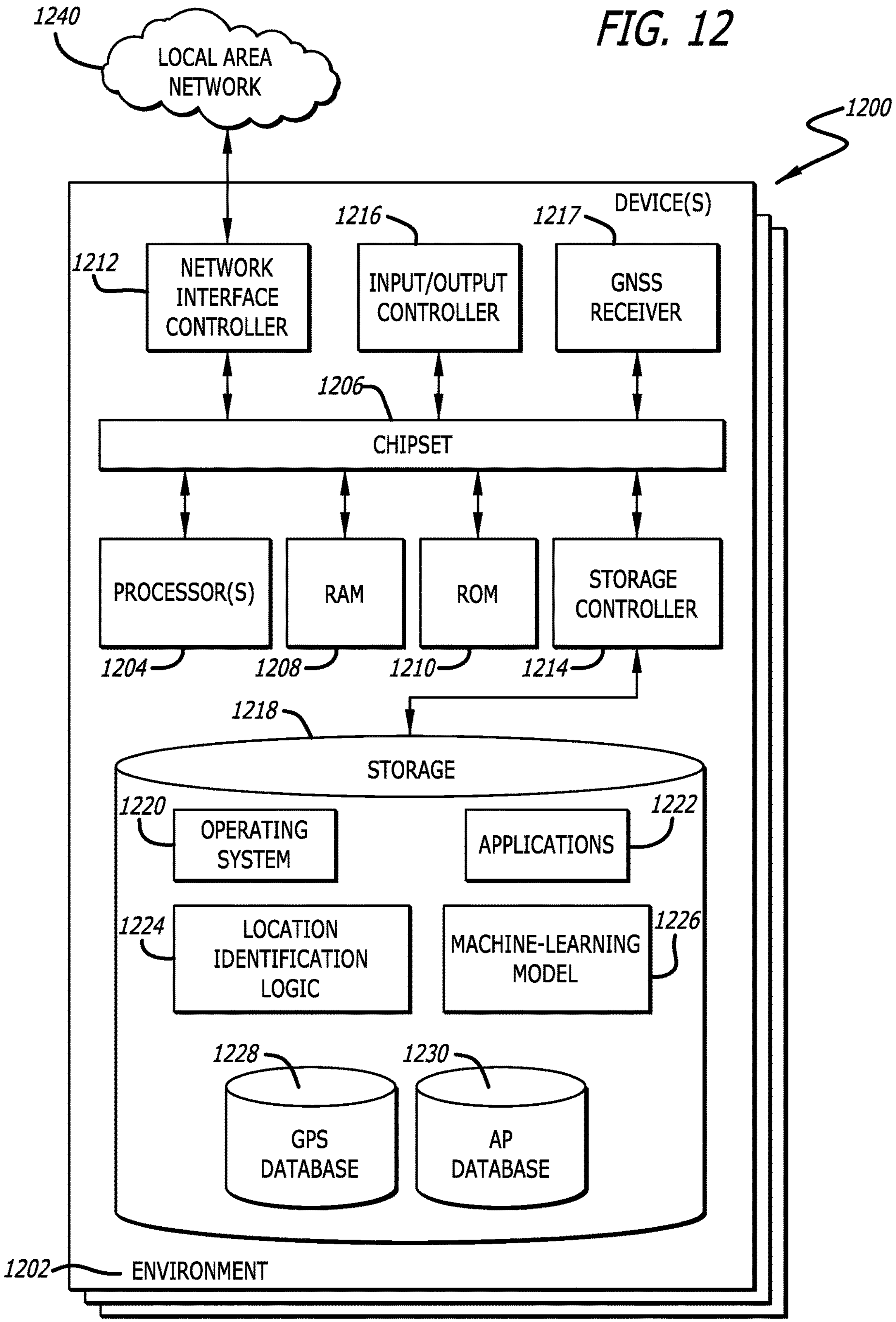
FIG. 12 is a conceptual block diagram of a device suitable for configuration with a location identification logic, in accordance with various embodiments of the disclosure.

Referring to FIG. 12, a conceptual block diagram of a device 1200 suitable for configuration with a location identification logic in accordance with various embodiments of the disclosure is shown. The embodiment of the conceptual block diagram depicted in FIG. 12 can illustrate a conventional server computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 12 can also illustrate an access point, a switch, or a router in accordance with various embodiments of the disclosure. The device 1200 may, in many non-limiting examples, correspond to physical devices or to virtual resources described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the device 1200.

In a number of embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1206 may provide an interface between the processor(s) 1204 and the remainder of the components and devices within the environment 1202. The chipset 1206 can provide an interface to a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Additional embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for instance, store an operating system 1220, applications 1222, GPS database 1228 and AP database 1230 which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

In many more embodiments, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more devices 1200 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1218 can store other system or application programs and data utilized by the device 1200.

In many additional embodiments, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-11. In certain embodiments, the device 1200 can also include computer-readable storage media having instructions stored thereupon for performing any of the other computer-implemented operations described herein.

In many further embodiments, the device 1200 may include a location identification logic 1224. The location identification logic 1224 can be configured to perform one or more of the various steps, processes, operations, and/or other methods that are described above. Often, the location identification logic 1224 can be a set of instructions stored within a non-volatile memory that, when executed by the processor(s)/controller(s) 1204 can carry out these steps, etc. In some embodiments, the location identification logic 1224 may be a client application that resides on a network-connected device, such as, but not limited to, a server, switch, personal or mobile computing device in a single or distributed arrangement. In certain embodiments, the location identification logic 1224 can control the operation frequency and the output power of the device 1200 based on the location of the device 1200.

In still many embodiments, the device 1200 can include at least one GNSS receiver 1217. In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

In numerous embodiments, the storage 1218 can include the GPS database 1228 and the AP database 1230. The GNSS database 1228 and the AP database 1230 may be utilized by the location identification logic for retrieving the estimated location. In some embodiments, the GNSS database 1228 and the AP database 1230 may be accessible to the device 1200 by way of wired or wireless communication networks.

As described above, the device 1200 may support a virtualization layer, such as one or more virtual resources executing on the device 1200. In some examples, the virtualization layer may be supported by a hypervisor that provides one or more virtual machines running on the device 1200 to perform functions described herein. The virtualization layer may generally support a virtual resource that performs at least a portion of the techniques described herein.

Finally, in numerous additional embodiments, data may be processed into a format usable by a machine-learning model 1226 (e.g., feature vectors), and or other pre-processing techniques. The machine-learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226.

The ML model(s) 1226 can be configured to generate inferences to make predictions or draw conclusions from data. An inference can be considered the output of a process of applying a model to new data. This can occur by learning from at least the GPS database 1228 and the AP database 1230 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1226 may be generated by human/administrator verifications or may compare predicted outcomes with actual outcomes.

Although a specific embodiment for a device suitable for configuration with a location identification logic for carrying out the various steps, processes, methods, and operations described herein is discussed with respect to FIG. 12, any of a variety of systems and/or processes may be utilized in accordance with embodiments of the disclosure. For example, the device may be in a virtual environment such as a cloud-based network administration suite, or it may be distributed across a variety of network devices or APs. The elements depicted in FIG. 12 may also be interchangeable with other elements of FIGS. 1-11 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor;

at least one global navigation satellite system (GNSS) receiver configured to receive a plurality of signals from one or more satellites; and a location identification logic, configured to:

identify a first contour of geolocations;

identify a second contour of geolocations;

determine an area of overlap between the first contour and the second contour, wherein the area of overlap forms an ellipse in which a demi-major-axis ("DMA") length depends on a number of GNSS measurements that the device collects before the one or more satellites move out of range; and determine a location of the device based on the area of overlap in real-time.

2. The device of claim 1, wherein the location identification logic is further configured to determine a first pseudo range difference based on a first signal and a second signal received from a first satellite, and wherein the first contour of geolocations is associated with the first pseudo range difference.

3. The device of claim 2, wherein the location identification logic is further configured to determine a second pseudo range difference is based on a third signal and a fourth signal received from a second satellite, and wherein the second contour of geolocations is associated with the second pseudo range difference.

4. The device of claim 3, wherein:

the first signal and the second signal are received during a first time period, and the third signal and the fourth signal are received during a second time period.

5. The device of claim 4, wherein the device is stationary during the first time period and the second time period.

6. The device of claim 4, wherein the location identification logic is further configured to:

receive a fifth signal from a third satellite, wherein the fifth signal includes a pseudo random code indicative of a satellite identifier and a timestamp;

determine a clock drift based on the pseudo random code; and synchronize a local clock signal based on the clock drift.

7. The device of claim 6, wherein the location identification logic determines the first pseudo range difference and the second pseudo range difference based on the local clock signal.

8. The device of claim 6, wherein the device operates in a safe mode until the location of the device is determined.

9. The device of claim 4, wherein determining the first pseudo range difference comprises:

receiving the first signal from the first satellite at a first time instant;

extracting a first timestamp from the first signal;

receiving the second signal from the first satellite at a second time instant;

extracting a second timestamp from the second signal;

determining a distance travelled by the first satellite in the first time period based on a difference between the first timestamp and the second timestamp; and determining the first pseudo range difference based on the distance travelled by the first satellite in the first time period.

10. The device of claim 4, wherein determining the second pseudo range difference comprises:

receiving the third signal from the second satellite at a third time instant;

extracting a third timestamp from the third signal;

receiving the fourth signal from the second satellite at a fourth time instant;

extracting a fourth timestamp from the second signal;

determining a distance travelled by the second satellite in the second time period based on a difference between the third timestamp and the fourth timestamp; and determining the second pseudo range difference based on the distance travelled by the second satellite in the second time period.

11. The device of claim 3, wherein each of the first signal and the second signal received from the first satellite, and the third signal and the fourth signal received from the second satellite includes corresponding pseudo random code, corresponding almanac data, and corresponding ephemeris data.

12. The device of claim 1, wherein the location identification logic is further configured to determine an operating frequency and an output power level of the device based on the location of the device.

13. The device of claim 1, wherein the location of the device is refined based on a plurality of contours of geolocations determined for a plurality of pseudo range differences for a plurality of satellites.

14. A device comprising:

a processor;

a memory communicatively coupled to the processor;

at least one global navigation satellite system (GNSS) receiver configured to receive a plurality of signals from one or more satellites; and a location identification logic, configured to:

identify a first contour of geolocations;

retrieve an estimated location of the device;

determine an area of overlap between the first contour and the estimated location, wherein the area of overlap forms an ellipse; and determine a location of the device based on the area of overlap in real-time.

15. The device of claim 14, further comprising determining a first pseudo range difference based on a first signal and a second signal received from a first satellite in a first time period, wherein the first contour of geolocations is associated with the first pseudo range difference.

16. The device of claim 15, wherein retrieving the estimated location comprises:

querying a global positioning system (GPS) database of a plurality of fixed stations;

determining a set of fixed stations from the plurality of fixed stations that observe the first pseudo range difference for the first satellite in the first time period;

determining a closest fixed station from the set of fixed stations; and retrieving a location of the closest fixed station from the GPS database as the estimated location.

17. The device of claim 15, wherein retrieving the estimated location comprises:

detecting one or more wireless signals with one or more access point identifiers;

querying a crowd-sourced database of a plurality of access points and corresponding access point identifiers;

identifying one or more access points based on the one or more access point identifiers;

determining a closest access point from the one or more access points; and retrieving a location of the closest access point from the crowd-sourced database as the estimated location.

18. The device of claim 15, wherein retrieving the estimated location comprises:

transmitting an echo request to a plurality of servers;

receiving a plurality of responses from the plurality of servers;

determining a round-trip time for each response;

determining a server with lowest round-trip time; and extracting a location of the server with the lowest round-trip time from corresponding response as the estimated location.

19. A method comprising:

determining a first pseudo range difference based on a first signal and a second signal received by a device from a first satellite in a first time period;

identifying a first contour of geolocations having the first pseudo range difference corresponding to the first satellite in the first time period;

retrieving an estimated location of the device;

determining an area of overlap between the first contour and the estimated location, wherein the area of overlap forms an ellipse; and determining a location of the device based on the area of overlap in real-time, wherein the device is stationary during the first time period.

20. The method of claim 19, wherein retrieving the estimated location is retrieved from at least one of: a Global Positioning System (GPS) database or a crowd-sourced database of a plurality of access points.

* * * * *